(12) United States Patent
Kawabata (10) Patent No.: US 8,708,670 B2
(45) Date of Patent: Apr. 29, 2014

(54) STRUCTURE FOR COUPLING ROTARY SHAFTS AND PUMP DEVICE OF ROTARY TYPE

(75) Inventor: Tomoaki Kawabata, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 280 days.

(21) Appl. No.: 12/947,925

(22) Filed: Nov. 17, 2010

(65) Prior Publication Data

US 2011/0116949 A1 May 19, 2011

(30) Foreign Application Priority Data

Nov. 19, 2009 (JP) .................................. 2009-263863

(51) Int. Cl.
*F04B 35/04* (2006.01)

(52) U.S. Cl.
USPC ........................................ 417/410.4; 464/182

(58) Field of Classification Search
USPC .................. 417/359, 410.4; 464/178, 182
See application file for complete search history.

(56) References Cited

U.S. PATENT DOCUMENTS

| | | | | | |
|---|---|---|---|---|---|
| 2,309,683 | A | * | 1/1943 | Wahlmark | 417/360 |
| 4,043,146 | A | * | 8/1977 | Stegherr et al. | 464/177 |
| 4,185,474 | A | * | 1/1980 | Kulischenko | 464/52 |
| 4,230,438 | A | * | 10/1980 | Lehmann et al. | 415/216.1 |
| 5,917,259 | A | * | 6/1999 | Stridsberg | 310/75 D |
| 6,168,530 | B1 | * | 1/2001 | Guimbal et al. | 464/178 |
| 6,347,843 | B1 | | 2/2002 | Murayama et al. | |
| 2005/0191189 | A1 | * | 9/2005 | Fuchida et al. | 417/410.1 |
| 2005/0232789 | A1 | * | 10/2005 | Hinz et al. | 417/410.1 |

FOREIGN PATENT DOCUMENTS

| | | |
|---|---|---|
| GB | 1056687 A | 1/1967 |
| JP | 7-217567 A | 8/1995 |
| JP | 2000-009058 A | 1/2000 |
| JP | 2000-249080 A | 9/2000 |
| JP | 2000-346086 A | 12/2000 |
| JP | 2006-220251 A | 8/2006 |

OTHER PUBLICATIONS

Official Action issued by Japanese Patent Office on Sep. 3, 2013 in Japanese Application No. 2009-263863, and English language translation of Official Action (6 PGS).
Office Action (Notification of Reason(s) for Refusal) issued on Dec. 10, 2013, by the Japanese Patent Office in Japanese Patent Application No. 2010-210301, and an English Translation of the Office Action. (4 pages).

* cited by examiner

*Primary Examiner* — Charles Freay
(74) *Attorney, Agent, or Firm* — Buchanan Ingersoll & Rooney P.C.

(57) ABSTRACT

An object of the invention is to provide a structure for coupling two rotary shafts, which can be made smaller in size. A driving shaft for pumps is rotatably supported by a first bearing and a second bearing, while a rotary shaft of an electric motor is rotatably supported by the second bearing and a third bearing. Each one end of the driving shaft and the rotary shaft is inserted into the common second bearing, so that rotation of the rotary shaft is transmitted to the driving shaft.

6 Claims, 3 Drawing Sheets

STRUCTURE FOR COUPLING ROTARY SHAFTS AND PUMP DEVICE OF ROTARY TYPE

CROSS REFERENCE TO RELATED APPLICATION

This application is based on Japanese Patent Application No. 2009-263863 filed on Nov. 19, 2009, the disclosure of which is incorporated herein by reference.

FIELD OF THE INVENTION

The present invention relates to a structure for coupling two rotary shafts and a pump device of a rotary type, such as a trochoid type pump, having the coupling structure.

BACKGROUND OF THE INVENTION

A pump device of a rotary type for a vehicle brake control system is known in the art, for example, as disclosed in Japanese Patent Publication No. H07-217567, according to which a structure for coupling two rotary shafts is applied to the pump device. In the pump device of the rotary type, a pump shaft is rotatably supported by two bearings, while a motor shaft is rotatably supported by other two bearings. Namely, in the pump, the pump shaft and the motor shaft are respectively supported by independent bearings. According to such a structure, misalignment may be generated between the pump shaft and the motor shaft during an assembling process. Therefore, a coupling mechanism may be provided between the pump and motor shafts in order to absorb such misalignment between the shafts.

According to the structure of the above mentioned prior art, the pump shaft and the motor shaft are respectively supported by their own two bearings. Therefore, a space for arranging those four bearings in an axial direction is necessary, which may cause a problem that the pump device may become too long in the axial direction. It is, of course, necessary to provide the coupling mechanism for the purpose of absorbing the misalignment of the shafts when assembling an electric motor to a pump body of the pump device. In addition, wear-out may occur in the coupling mechanism. The coupling mechanism may become too large, if a long life should be ensured in view of the wear-out. In other words, the pump device may inevitably become too large in size.

SUMMARY OF THE INVENTION

The present invention is, therefore, made in view of the foregoing problem, and has an object to provide a structure for coupling two rotary shafts, wherein the structure is made smaller in size. It is another object of the invention to provide a pump device of a rotary type, to which the above mentioned coupling structure may be applied.

According to a feature of the invention, for example, as defined in the claim 1, a structure for coupling two rotary shafts has a first shaft and a second shaft, which are coaxially connected with each other. The structure for connecting the two rotary shaft further has a first bearing directly or indirectly fixed to a housing, a second bearing directly or indirectly fixed to the housing; and a third bearing directly or indirectly fixed to the housing. In such a structure, the first shaft is rotatably supported by the first and second bearings, the second shaft is rotatably supported by the second and third bearings, and each one end of the first and second shafts is inserted into the second bearing so that the first and second shafts are rotatably supported by the second bearing and that each end of the first and second shafts is operatively coupled to each other to transmit rotation of one of the shafts to the other shaft.

As above, the second bearing functions as a common bearing for supporting both of the first and second shafts. As a result, when compared with a case in which the first and second shafts are respectively supported by their own two bearings, an axial length of the structure for connecting two rotary shafts can be made smaller in size.

According to another feature of the invention, for example, as defined in the claim 2, a pump device of a rotary type has a pump body having a pump casing. The pump device further has a pump accommodated in the pump casing, the pump having an inlet port for drawing working fluid and supplying the working fluid into a working chamber, the pump having an outlet port for discharging the working fluid from the working chamber. In addition, the pump device has a driving shaft accommodated in the pump casing and for driving the pump, a housing having a cylindrical recessed portion, into which the pump body is inserted, and an electric motor having an output shaft connected to the driving shaft so that the driving shaft is rotated by the rotation of the output shaft. The structure for coupling two rotary shafts according to the invention, such as the structure defined in the claim 1, is applied to the coupling between the driving shaft and the output shaft. More exactly, the driving shaft corresponds to the first shaft, and the output shaft corresponds to the second shaft, and the second bearing is fixed to the pump casing, so that the second bearing is finally fixed, to the housing.

As above, the structure for coupling the rotary shafts can be applied to the pump device of the rotary type, which has the driving shaft of the pump and the output shaft of the electric motor. When the structure for coupling the rotary shafts of the present invention is applied to the pump device, the output shaft may be aligned to the second bearing, which is fixed to the pump body fixed to the housing. As a result, it is possible to suppress generation of misalignment of the two rotary shafts to be connected to each other. Therefore, when the rotation of the output shaft of the electric motor is transmitted to the driving shaft of the pump, it is also possible to suppress generation of wear-out at the coupling portion between the two shafts.

In addition, the second bearing is fixed to the housing, as a result that the pump body is fixed to the housing. Therefore, when compared with a case, in which the second bearing may be fixed to the electric motor (which is in a condition before being assembled to the housing), it is possible according to the present embodiment to stably support the driving shaft of the pump in the housing, even before the electric motor is assembled to the housing.

Therefore, even when the housing (to which the electric motor is not yet assembled) is vibrated during transportation, the driving shaft is firmly and stably held by the second bearing. Therefore, there is no danger that the driving shaft and/or the seal members in contact with rotating portions connected to the driving shaft may be damaged.

According to a further feature of the invention, for example, as defined in the claim 3, the pump device has a seal member, which is provided between the pump casing and the driving shaft for sealing the pump from the electric motor, and the second bearing is provided between the seal member and the electric motor.

As above, the second bearing is provided on a side, which is closer to the pump body than the seal member. Therefore, it is possible to avoid such a situation that the rotary shaft may damage the seal member when the rotary shaft is assembled to the driving shaft.

According to a still further feature of the invention, for example, as defined in the claim 4, the pump casing has a cylindrically shaped first casing for accommodating the pump and a second casing coaxially fixed to the first casing, wherein the second casing is arranged between the first casing and the electric motor. Then, the seal member is provided in the first casing, and the second bearing is provided in the second casing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
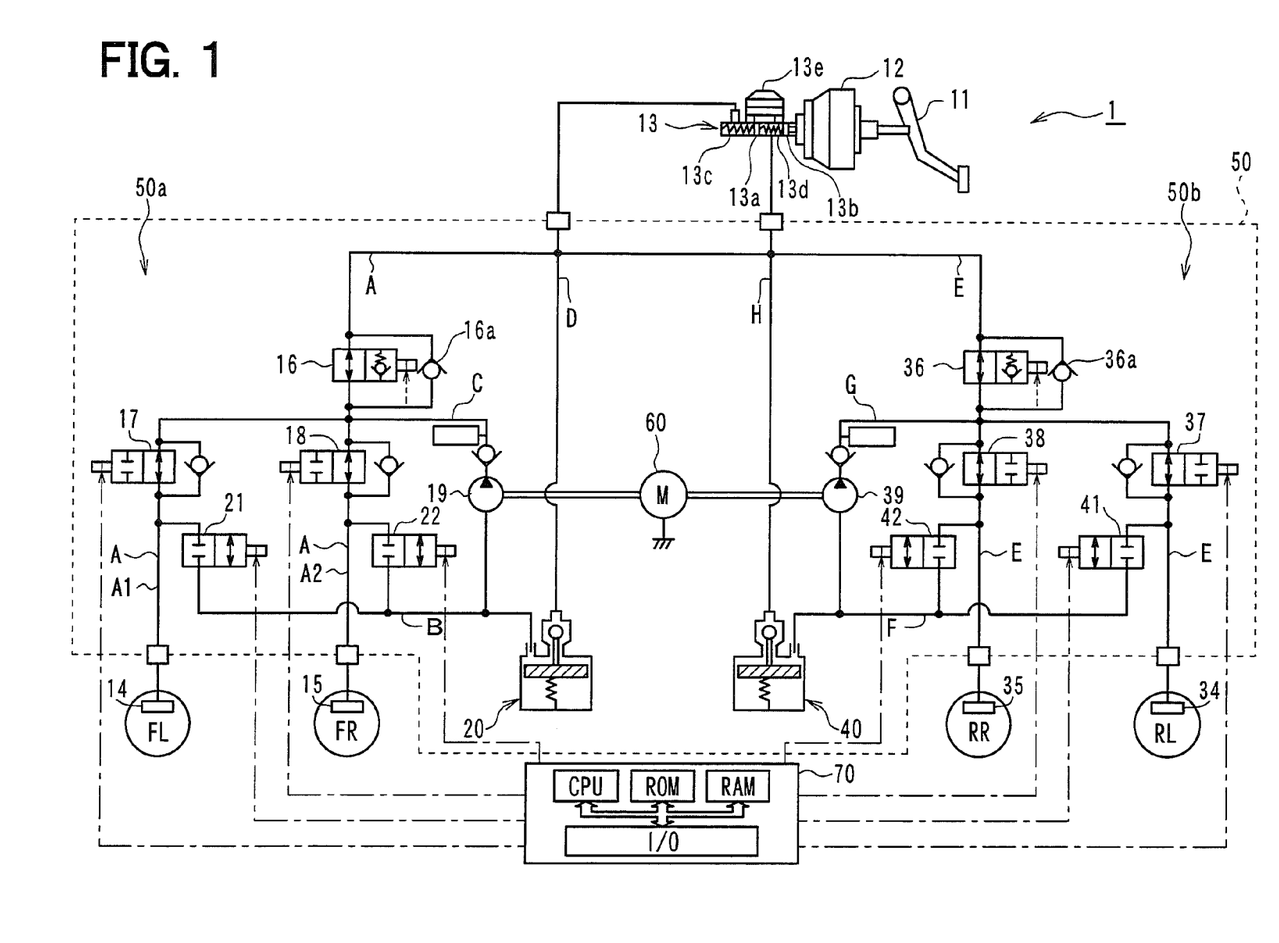
FIG. 1 is a schematic view showing a hydraulic brake system, to which a pump device of a rotary type according to an embodiment of the present invention is applied.

Embodiments of the present invention will be explained hereinafter with reference to the drawings. FIG. 1 is a schematic view showing a hydraulic brake system, to which a pump device of a rotary type according to an embodiment of the present invention is applied. At first, a basic structure for a vehicle brake control system will be explained with reference to FIG. 1. In FIG. 1, an example, in which the vehicle brake control system of the present invention is applied to a four-wheeled vehicle having a front and a rear hydraulic system, will be explained. However, the present invention may be also applied to another type of a hydraulic system, for example, to a cross type (or X-type) system, in which a front-right wheel and a rear-left wheel are controlled by one hydraulic system, while a front-left wheel and a rear-right wheel are controlled by another hydraulic system.

FIG. 1 shows a detailed structure of respective components for a brake control apparatus 1. As shown in FIG. 1, when a brake pedal 11 is stepped by a vehicle driver, the stepping force is increased by a brake booster 12 to push master pistons 13a and 13b provided in a master cylinder 13. A master cylinder pressure (M/C pressure) is generated in each of a primary chamber 13c and a secondary chamber 13d, which are defined by the master pistons 13a and 13b, wherein the M/C pressures in the primary and secondary chambers 13c and 13d are the same to each other. The M/C pressures are applied to respective wheel cylinders 14, 15, 34, 35 through a hydraulic brake actuator 50 for controlling brake fluid pressure. The master cylinder 13 has a master reservoir 13e, which has fluid passages for communicating the primary and secondary chambers 13c and 13d with each other.

The hydraulic brake actuator 50 has a first hydraulic circuit 50a and a second hydraulic circuit 50b. The first hydraulic circuit 50a controls the brake fluid pressure to be applied to the wheel cylinders 14 and 15 of a front left wheel FL and a front right wheel FR, whereas the second hydraulic circuit 50b controls the brake fluid pressure to be applied to the wheel cylinders 34 and 35 of a rear right wheel RR and a rear left wheel RL.

Since the first and second hydraulic circuits 50a and 50b have the same structure to each other, an explanation will be made hereinafter only for the first hydraulic circuit 50a. An explanation for the second hydraulic circuit 50b is therefore omitted.

The first hydraulic circuit 50a has a main fluid passage A, through which the M/C pressure of the master cylinder 13 is applied to the wheel cylinder 14 for the front left wheel FL as well as the wheel cylinder 15 for the front right wheel FR, so that the wheel cylinder pressure (W/C pressure) is generated at the respective wheel cylinders.

The main fluid passage A has a first differential pressure control valve 16, which is switched to a communication mode or a differential pressure mode. More exactly, the first differential pressure control valve 16 is switched to the communication mode (namely, a valve position is so adjusted) during a normal braking operation when the brake pedal 11 is pressed by the vehicle driver, in other words, during a vehicle control operation in which no vehicle movement control is carried out.

When electric current is supplied to a solenoid coil provided in the first differential pressure control valve 16, the valve position is so adjusted that a larger pressure difference is generated at the first differential pressure control valve 16 as the electric current becomes larger.

When the first differential pressure control valve 16 is switched to the differential pressure mode, the brake fluid is allowed to flow from a side of the wheel cylinders 14 and 15 to a side of the master cylinder 13, only when the brake fluid pressure at the side of the wheel cylinders 14 and 15 becomes higher than that at the side of the master cylinder 13. As a result, it is so controlled that the brake fluid pressure at the side of the wheel cylinders 14 and 15 may not become higher than that at the side of the master cylinder 13 by more than a predetermined pressure.

The main fluid passage A is branched out to fluid passages A1 and A2 at a downstream side of the first differential pressure control valve 16 (that is, on the side of the wheel cylinders 14 and 15). A first pressure increase valve 17 is provided in the fluid passage A1 for controlling the pressure increase of the brake fluid to the wheel cylinder 14, and a second pressure increase valve 18 is likewise provided in the fluid passage A2 for controlling the pressure increase of the brake fluid to the wheel cylinder 15.

Each of the first and second pressure increase valves 17 and 18 is composed of a 2-position electromagnetic valve, so that each of them is switched to a communication mode or a non-communication mode. More exactly, each of the pressure increase valves 17 and 18 is composed of an electromagnetic valve of a normally opened type, wherein a valve position is switched to the communication mode when no electric current is supplied to a solenoid thereof, while the valve position is switched to the non-communication mode when the electric current is supplied to the solenoid.

Another type of the electromagnetic valve, according to which a pressure difference becomes larger as the electric current is larger, like the first pressure difference control valve 16, may be used as the first and second pressure increase valves 17 and 18.

A fluid passage B connects each of intermediate points between the first and second pressure increase valves 17 and 18 and the wheel cylinders 14 and 15 with a pressure regulating reservoir 20. A first and a second pressure decrease valve 21 and 22 are respectively provided in the fluid passage B. Each of the pressure decrease valve 21 and 22 is composed of an electromagnetic 2-position valve, wherein a valve position is switched from a communication mode (an opened state) to a non-communication mode (a closed state) and vice versa. And those pressure decrease valves 21 and 22 are normally closed type valves.

A fluid passage C is provided as a fluid return line between the pressure regulating reservoir 20 and the main fluid passage A. A fluid pump 19 driven by an electric motor 60 is provided in the fluid passage C, wherein the pump 19 draws the brake fluid from the pressure regulating reservoir 20 and pumps out pressurized brake fluid to the master cylinder 13 or to the wheel cylinders 14 and 15. The electric motor 60 is operated by controlling current supply to a motor relay (not shown).

A fluid passage D is provided between the pressure regulating reservoir 20 and the master cylinder 13. The pump 19 draws the brake fluid from the master cylinder 13 through the fluid passage D and pumps out the pressurized brake fluid to the main fluid passage A during the vehicle movement control, so that the pump 19 supplies the brake fluid to the side of the wheel cylinders 14 and 15 to thereby increase the W/C pressure at the wheel cylinder 14 and/or 15 to be controlled. As explained above, the second hydraulic circuit 50b has the same components and structure to the first hydraulic circuit 50a. More exactly, the second hydraulic circuit 50b has a second differential pressure control valve 36 (corresponding to the first differential pressure control valve 16), a third and fourth pressure increase valves 37 and 38 (corresponding to the first and second pressure increase valves 17 and 18), a third and fourth pressure decrease valves 41 and 42 (corresponding to the first and second pressure decrease valves 21 and 22), a pump 39 (corresponding to the pump 19), a pressure regulating reservoir 40 (corresponding to the pressure regulating reservoir 20), and fluid passages E to H (corresponding to the fluid passages A to D).

A brake control ECU 70 controls an operation of the brake control apparatus 1 and is composed of a well known micro computer having CPU, ROM, RAM and I/O. The ECU 70 carries out processes, such as various calculations for the vehicle movement controls (a vehicle sideslip control and so on) in accordance with programs stored in the ROM and the like.

The ECU 70 calculates various physical values based on detection signals from sensors (not shown) and determines based on the calculated physical values whether the vehicle movement control should be carried out or not. And when it is carried out, the ECU 70 calculates a physical value for the wheel cylinder to be controlled, namely the W/C pressure to be generated at the wheel cylinder to be controlled. Based on such calculation, the ECU 70 carries out current supply control to the respective control valves 16 to 18, 21, 22, 36 to 38, 41 and 42 as well as current supply control to the electric motor 60 for driving the pumps 19 and 39. As a result, the W/C pressure at the wheel cylinder to be controlled is controlled to carry out the vehicle movement control.

When no braking pressure is generated at the master cylinder 13, for example, during a traction control, a vehicle sideslip control, and so on, the pumps 19 and 39 are operated and the first and second differential pressure control valves 16 and 36 are switched to the differential pressure mode, so that the brake fluid can be supplied to a downstream side of the first and second differential pressure control valves 16 and 36 (namely to the side of the wheel cylinders 14, 15, 34 and 35) through the fluid passages D and H. The first to fourth pressure increase valves 17, 18, 37 and 38 as well as the first to fourth pressure decrease valves 21, 22, 41 and 42 are properly controlled, to thereby control the pressure increase or pressure decrease at the wheel cylinders to be controlled. As above, the W/C pressure is controlled at a desired value.

During the ABS control, the first to fourth pressure increase valves 17, 18, 37 and 38 as well as the first to fourth pressure decrease valves 21, 22, 41 and 42 are properly controlled, and the pumps 19 and 39 are operated at the same time. As a result, the pressure increase or pressure decrease at the wheel cylinders to be controlled is controlled, and the W/C pressure is controlled at a desired value.

Figure 2:
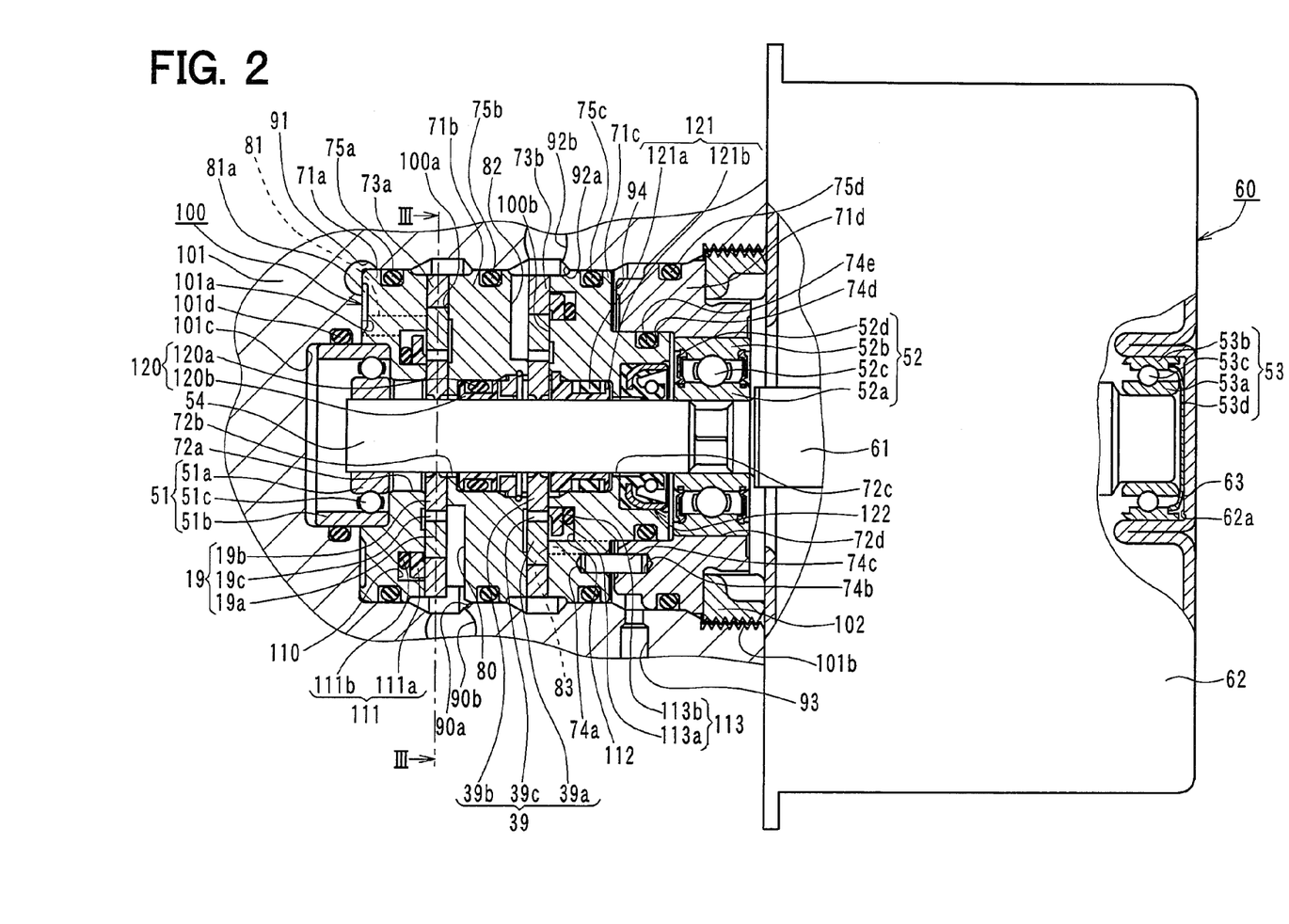
FIG. 2 is a schematic cross sectional view showing the pump device of the rotary type having rotary pumps 19 and 39, a pump body 100 and an electric motor 60.

A structure of a pump device of a rotary type for the vehicle brake control system, namely a structure of the pumps 19 and 39 as well as the electric motor 60 will be explained. FIG. 2 is a schematic cross sectional view showing the pump device of the rotary type having a pump body 100 including the pumps 19 and 39 and the electric motor 60. FIG. 2 shows a condition, in which the pump body 100 is assembled to a housing 101 of the hydraulic brake actuator 50, wherein an upper-down direction in the drawing (FIG. 2) corresponds to a vertical direction of the vehicle.

As already explained above, the vehicle brake control system has the first and second hydraulic circuits 50a and 50b. Therefore, the pump body 100 has the first rotary type pump 19 for the first hydraulic circuit 50a and the second rotary type pump 39 for the second hydraulic circuit 50b, as shown in FIG. 2.

A driving shaft 54, which is rotatably supported by first and second bearings 51 and 52, is driven by the electric motor 60, so that the rotary type pumps 19 and 39 provided in the pump body 100 are operated. A pump casing for constituting an outside of the pump body 100 is composed of a first to a fourth cylinders (side plates) 71a to 71d and a first and second cylindrical center plates 73a and 73b. The first bearing 51 is arranged in the first cylinder 71a, while the second bearing is arranged in the fourth cylinder 71d.

The first cylinder 71a, the first center plate 73a, the second cylinder 71b, the second center plate 73b and the third cylinder 71c are lapped over one another in this order, and they are lap-welded at their overlapping outer peripheries. Those cylinders and center plates are unitized as a first casing. The fourth cylinder 71d is formed as a second casing, which is coaxially arranged with the first casing, so that the first casing and the second casing form the casing for the pump body 100. Recessed portions 74a and 74b are formed at each of end surfaces of the third and fourth cylinders 71c and 71d facing to each other. A pin 74c is inserted into the recessed portions 74a and 74b, so that the first and second casings are aligned in a rotational direction of the driving shaft 54.

As above, the pump body 100 is integrally formed. And a first cylindrical recessed portion 101a is formed in the housing 101 of the hydraulic brake actuator 50, into which the pump body 100 is inserted in a direction from a right-hand side to a left-hand side in FIG. 2 (hereinafter, this direction will be also referred to as an insertion direction).

A female screw portion 101b is formed at an entrance of the cylindrical recessed portion 101a. A male screw member 102 of a ring shape is screwed into the female screw portion 101b, so that the pump body 100 is fixed to the housing 101. Because of the male screw member 102 screwed into the female screw portion 101b, the pump body 100 is firmly assembled to the housing 101.

A second cylindrical recessed portion 101c is formed in the housing 101 at a bottom of the first cylindrical recessed portion 101a, that is, at a position facing to a forward end (a left-hand end) of the driving shaft 54. An inner diameter of the second cylindrical recessed portion 101c is substantially the same to an outer diameter of the first bearing 51 outwardly projecting in the insertion direction from the first cylinder 71a, and smaller than the outer diameter of the first cylinder 71a. Therefore, a projecting portion of the first bearing 51 is inserted into the second cylindrical recessed portion 101c. A bottom surface of the first cylindrical recessed portion 101a (except for the second cylindrical recessed portion 101c) faces to and is in contact with an axial end surface of the first cylinder 71a.

Each of the first to fourth cylinders 71a to 71d has a first to a fourth center through-hole 72a to 72d, through which the driving shaft 54 is inserted. The driving shaft 54 is rotatably supported by the first bearing 51 arranged at an inner periphery of the first center through-hole 72a of the first cylinder 71a and by the second bearing 52 arranged at an inner periphery of the fourth center through-hole 72d of the fourth cylinder 71d. Any types of bearings may be used as the first and second bearings 51 and 52. However, according to the present embodiment, a ball bearing with a small width is used.

More exactly, the first bearing 51 has an inner ring 51a, an outer ring 51b and a rolling element 51c. The driving shaft 54 is inserted through the inner ring 51a, so that the driving shaft 54 is rotatably supported. The center through-hole 72a of the first cylinder 71a is enlarged in its diameter at a side of the end surface (the left-hand side surface) to such a diameter corresponding to the outer diameter of the first bearing 51, so that the first bearing 51 is inserted into such an enlarged portion of the center through-hole 72a and fixed to the first cylinder 71a.

An axial length of the outer ring 51b is made longer than that of the inner ring 51a, so that a part of the outer ring 51b (a left-hand portion thereof) projects in the left-hand direction (the insertion direction) from the left-hand side surface of the first cylinder 71a. As explained above, the projecting portion (the left-hand portion) of the outer ring 51b of the first bearing 51 is inserted into the second cylindrical recessed portion 101c. An O-ring 101d is provided at an inner peripheral wall of the second cylindrical recessed portion 101c, so as to surround an outer peripheral wall of the outer ring 51b.

The second bearing 52 likewise has an inner ring 52a, an outer ring 52b and a rolling element 52c. The outer ring 52b is press inserted into the center through-hole 72d of the fourth cylinder 71d and fixed thereto. The driving shaft 54 is inserted through the inner ring 52a, so that the driving shaft 54 is rotatably supported. A seal plate 52d is provided at the second bearing 52. Since the second bearing 52 is arranged at a rear side of the pump body 100 in the insertion direction, the brake fluid is prevented from leaking out through the second bearing 52. As explained below, since the second bearing 52 also rotatably supports a rotary shaft 61 corresponding to an output shaft of the electric motor 60, an axial length of the second bearing 52 is designed to have a value enough to support two shafts at the same time.

Figure 3:
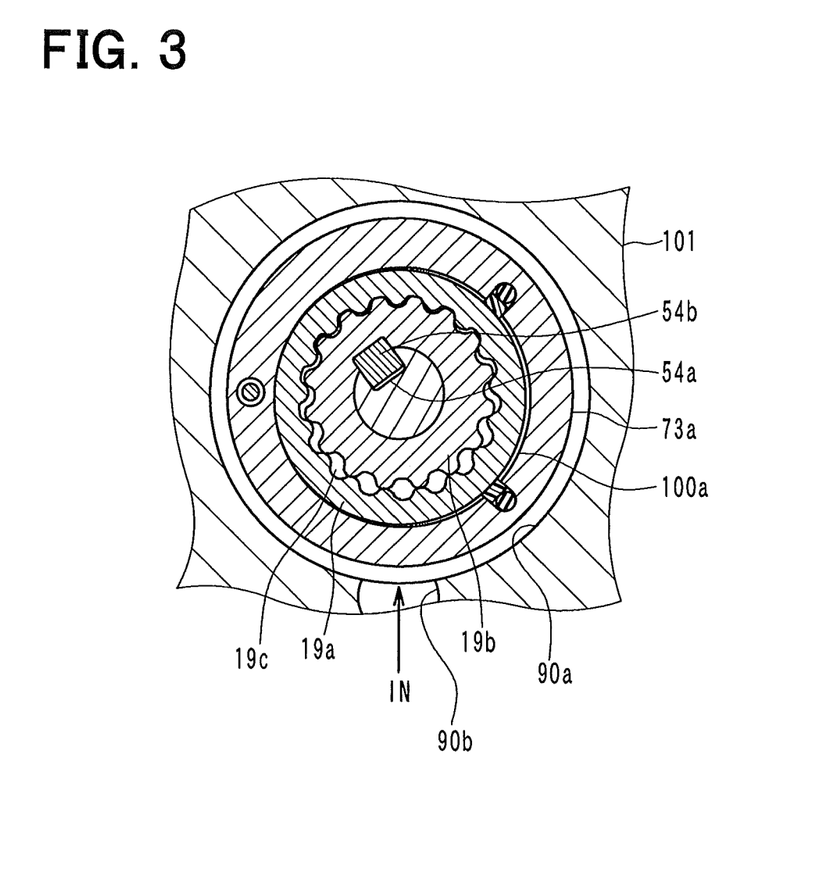
FIG. 3 is a cross sectional view taken along a line in FIG. 2.

The rotary-type pumps 19 and 39 are arranged in a space surrounded by the first and second bearing 51 and 52. FIG. 3 is a cross sectional view taken along a line in FIG. 2. A detailed structure of the rotary-type pumps 19 and 39 will be explained.

The rotary-type pump 19 is arranged in a rotor chamber 100a, which is defined by the first center plate 73a and the first and second cylinders 71a and 72b provided at both sides of the first center plate 73a. The rotary-type pump 19 is an internal gear pump (a trochoid pump), which is driven by the driving shaft 54.

More exactly, the rotary-type pump 19 has a rotational portion being composed of an outer rotor 19a and an inner rotor 19b, wherein an inner teeth portion is formed at an inner peripheral surface of the outer rotor 19a, while an outer teeth portion is formed at an outer peripheral surface of the inner rotor 19b. The driving shaft 54 is inserted through a center through-hole formed at a center of the inner rotor 19b. A key 54b is inserted into a key hole 54a formed in the driving shaft 54, so that torque of the driving shaft 54 is transmitted to the inner rotor 19b through the key 54b.

The outer and inner teeth portions (respectively formed at the outer and inner rotors 19a and 19b) are operatively engaged with each other to form multiple working chambers 19c therebetween, wherein volume of each working chamber is changed (increased and decreased) in accordance with the rotation of the driving shaft 54, so that the brake fluid is drawn into the working chamber and then pumped out from the working chamber 19c.

The rotary-type pump 39 is likewise arranged in a rotor chamber 100b, which is defined by the second center plate 73b and the second and third cylinders 71b and 72c provided at both sides of the second center plate 73b. Like the pump 19, the pump 39 has a rotational portion being composed of an outer rotor 39a and an inner rotor 39b, wherein an inner teeth portion is formed at an inner peripheral surface of the outer rotor 39a, while an outer teeth portion is formed at an outer peripheral surface of the inner rotor 39b. The pump 39 is also formed as the internal gear pump, so that the outer and inner teeth portions are operatively engaged with each other to form multiple working chambers 39c therebetween to draw and pump out the brake fluid. The pump 39 is arranged in the rotor chamber 100b, in such a manner that the pump 19 is rotated (displaced) by 180 degrees around the driving shaft 54.

According to such an arrangement, the working chamber 19c in a suction phase and the working chamber 19c in a discharging phase may be respectively symmetric to the working chambers 39c in the suction and discharging phases with respect to the driving shaft 54. As a result, high pressure of the brake fluid applied to the driving shaft 54 on a fluid discharging side may be counterbalanced between the pumps 19 and 39.

An inlet port (a first inlet port) 80 is formed in the second cylinder 71b, so that the inlet port 80 is communicated to the working chamber 19c of the pump 19 in the suction phase. The inlet port 80 is formed at the end surface (the left-hand surface) of the second cylinder 71b. The inlet port 80 extends in a radial direction and terminates at an outer peripheral wall of the second cylinder 71b. An annular groove (a first annular groove) 90a is formed in the housing 101 at an inner peripheral wall of the first cylindrical recessed portion 101a. A suction passage (a first suction passage) 90b is formed in the housing 101 and connected to the annular groove 90a. The inlet port 80 opening at the outer peripheral wall of the second cylinder 71b is communicated with the annular groove 90a. As a result, the brake fluid is supplied into the pump 19 from an outside of the pump body 100 via the suction passage 90b, the annular groove 90a and the inlet port 80.

An outlet port (a first outlet port) 81 is formed in the first cylinder 71a, so that the outlet port 81 is communicated to the working chamber 19c of the pump 19 in the discharging phase. The outlet port 81 is formed in the first cylinder in such a way that it extends from the one end surface (the right-hand surface) of the first cylinder 71a, which faces to the pump 19, to the other end surface (the left-hand surface) of the first cylinder 71a. A discharge passage 91 is formed in the housing 101 at the bottom surface of the first cylindrical recessed portion 101a. The outlet port 81 is connected to the discharge passage 91. As a result, the brake fluid is pumped out from the pump 19 (from the bottom portion of the first cylindrical recessed portion 101a of the pump body 100) via the outlet port 81 and the discharge passage 91. More detailed structure of the outlet port 81 will be further explained below.

The outlet port 81 includes an annular groove 110 formed at the end surface (the right-hand surface) of the first cylinder 71*a*, that is a side facing to the rotational portion of the pump 19. The annular groove 110 surrounds the driving shaft 54.

More exactly, a seal member 111 of a ring shape is provided in the annular groove 110, wherein the seal member 111 is pressed against end surfaces (left-hand surfaces) of the outer rotor 19*a* and the inner rotor 19*b*. The seal member 111 is composed of a ring member 111*a* made of resin and arranged at a side to the rotational portion of the pump 19 and a rubber member 111*b* for pushing the ring member 111*a* toward the rotational portion of the pump 19. An inside area of the seal member 111 faces to the working chamber 19*c* in the suction phase and a gap formed between an outer peripheral portion of the outer rotor 19*a* and an inner peripheral wall of the first center plate 73*a*, wherein the gap is formed on a side of not the working chamber 19*a* in the discharging phase but the working chamber 19*a* in the suction phase. On the other hand, an outside area of the seal member 111 faces to the working chamber 19*c* in the discharging phase and another gap formed between the outer peripheral portion of the outer rotor 19*a* and the inner peripheral wall of the first center plate 73*a*, wherein the other gap is formed on a side of the working chamber 19*c* in the discharging phase. In other words, the seal member 111 separates in a fluid sealing manner a lower pressure space (the inside area of the seal member 111) from a higher pressure space (the outside area of the seal member 111).

The seal member 111 is in contact with a radially inner peripheral surface of the annular groove 110, while only a portion of the seal member 111 is in contact with a radially outer peripheral surface of the annular groove 110. In other words, there is an annular space between the seal member 111 and the radially outer peripheral surface of the annular groove 110, so that the brake fluid may flow through such annular space. Thus, the outlet port 81 is composed of the straight passage formed in the first cylinder 71*a* extending in the axial direction thereof and the annular space of the annular groove 110.

In addition, an annular passage 81*a* is formed at the end surface (left-hand surface, i.e. a forward end surface in the insertion direction) of the first cylinder 71*a*, in order to communicate the outlet port 81 with the discharge passage 91. The annular passage 81*a* is so formed that it surrounds a whole outer periphery of the first bearing 51. Even in the case that a position of the discharge passage 91 is misaligned, the outlet port 81 is surely communicated to the discharge passage 91 through the annular passage 81*a*. When the end surface of the first cylinder 71*a* is brought into contact with the bottom surface of the first cylindrical recessed portion 101*a*, a gap between them may be eliminated and thereby there is a danger that the outlet port 81*a* may not be communicated to the discharge passage 91. However, because of the annular passage 81*a*, the outlet port 81 can be always communicated to the discharge passage 91.

In addition, a second inlet port 82 is likewise formed in the second cylinder 71*b* at the end surface opposite to the end surface of the first inlet port 80, so that the second inlet port 82 is communicated to the working chamber 39*c* of the pump 39 in the suction phase. The second inlet port 82 is formed at the end surface of the second cylinder 71*b* (the right-hand surface, that is, the side facing to the pump 39). The second inlet port 82 extends in a radial direction and terminates at the outer peripheral wall of the second cylinder 71*b*. A second annular groove 92*a* is formed in the housing 101 at the inner peripheral wall of the first cylindrical recessed portion 101*a*. A second suction passage 92*b* is formed in the housing 101 and connected to the second annular groove 92*a*. The second inlet port 82 opening at the outer peripheral wall of the second cylinder 71*b* is communicated with the second annular groove 92*a*. As a result, the brake fluid is supplied into the pump 39 from the outside of the pump body 100 via the second suction passage 92*b*, the second annular groove 92*a* and the second inlet port 82.

A second outlet port 83 is formed in the third cylinder 71*c*, so that the second outlet port 83 is communicated to the working chamber 39*c* of the pump 39 in the discharging phase. The second outlet port 83 is formed in the third cylinder 71*c* in such a way that it extends from the one end surface (the left-hand surface) of the third cylinder 71*c*, which faces to the pump 39, to the other end surface (the right-hand surface) of the third cylinder 71*c*. A second discharge passage 93 is formed in the housing 101, wherein the second discharge passage 93 is opened to an inner peripheral surface of the first cylindrical recessed portion 101*a*. A space 94 is formed between the third cylinder 71*c* and the fourth cylinder 71*d*. The second outlet port 83 is communicated to the second discharge passage 93 through the space 94. As a result, the brake fluid is pumped out from the pump 39 (from an outer peripheral portion of the pump body 100) via the second outlet port 83, the space 94 and the second discharge passage 93. More detailed structure of the second outlet port 83 will be further explained below.

The second outlet port 83 includes a second annular groove 112 formed at the end surface (the left-hand surface) of the third cylinder 71*c*, that is a side facing to the rotational portion of the pump 39. The second annular groove 112 surrounds the driving shaft 54.

More exactly, a second seal member 113 of a ring shape is provided in the second annular groove 112. The second seal member 113 is composed of a ring member 113*a* made of resin and arranged at a side to the rotational portion of the pump 39 and a rubber member 113*b* for pushing the ring member 113*a* toward the rotational portion of the pump 39. An inside area of the second seal member 113 faces to the working chamber 39*c* in the suction phase and a gap formed between an outer peripheral portion of the outer rotor 39*a* and an inner peripheral wall of the second center plate 73*b*, wherein the gap is formed on a side of not the working chamber 39*a* in the discharging phase but the working chamber 39*a* in the suction phase. On the other hand, an outside area of the second seal member 113 faces to the working chamber 39*c* in the discharging phase and another gap formed between the outer peripheral portion of the outer rotor 39*a* and the inner peripheral wall of the second center plate 73*b*, wherein the other gap is formed on a side of the working chamber 39*c* in the discharging phase. As above, the second seal member 113 separates in a fluid sealing manner a lower pressure space (the inside area of the second seal member 113) from a higher pressure space (the outside area of the second seal member 113).

The second seal member 113 is in contact with a radially inner peripheral surface of the second annular groove 112, while only a portion of the second seal member 113 is in contact with a radially outer peripheral surface of the second annular groove 112. In other words, there is an annular space between the second seal member 113 and the radially outer peripheral surface of the second annular groove 112, so that the brake fluid may flow through such annular space. Thus, the second outlet port 83 is composed of the straight passage formed in the third cylinder 71*c* extending in the axial direction thereof, the space 94, and the annular space formed in the second annular groove 112.

In FIG. 2, the suction passage 90*b* and the discharge passage 91 correspond to the fluid passage C in FIG. 1, while the second suction passage 92b and the second discharge passage 93 correspond to the fluid passage G in FIG. 1.

A diameter of the second center through-hole 72b of the second cylinder 71b, more exactly, a diameter of a portion thereof on the right-hand side, is made larger than that of the other portion on the left-hand side and larger than an outer diameter of the driving shaft 54. The portion is also referred to as a large-diameter portion. A seal member 120 is accommodated in the large-diameter portion so as to seal the pumps 19 and 39 from each other. The seal member 120 has a ring member 120b made of resin and an O-ring 120a, which is inserted into an annular groove formed in the ring member 120b. More exactly, the annular groove has a U-shaped cross section having a bottom at a radially inner periphery, and the annular groove is opened in a radial outward direction. The ring member 120b is pushed toward the driving shaft 54 by elastic force of the O-ring 120a, so that the ring member 120b is in contact with the driving shaft 54.

In a similar manner to the above seal member 120 provided in the second cylinder 71b, a diameter of the third center through-hole 72c of the third cylinder 71c, more exactly, a diameter of a portion thereof on the left-hand side, is made larger than that of the other portion and the outer diameter of the driving shaft 54. A seal member 121 is accommodated in the large-diameter portion so as to seal the pump 39 from the outside of the housing 101. The seal member 121 has a ring member 121b made of resin and an elastic ring 121a made of rubber, which is inserted into an annular groove formed in the ring member 121b. The annular groove has a U-shaped cross section having a bottom at a radially inner periphery, and the annular groove is opened in a radial outward direction. The ring member 121b is pushed toward the driving shaft 54 by elastic force of the elastic ring 121a, so that the ring member 121b is in contact with the driving shaft 54.

In addition, another large-diameter portion is formed on the right-hand side of the third cylinder 71c (on a side to the electric motor 60), opposite to the seal member 121, and an oil seal member 122 is provided in the other large-diameter portion.

According to the above structure, the leakage of the brake fluid to the outside through the center through-hole 72c is basically prevented by the seal member 121. The oil seal member 122 further ensures the prevention of the leakage of the brake fluid.

Furthermore, a small-diameter portion is formed in the third cylinder 71c on the right-hand side (on the side facing to the fourth cylinder 71d), namely an outer diameter of the third cylinder 71c is made smaller than the inner diameter of the first cylindrical recessed portion 101a and such small-diameter portion is inserted into the center through-hole 72d of the fourth cylinder 71d. An annular groove 74d is formed at an outer peripheral surface of the small-diameter portion, which is inserted into the center through-hole 72d of the fourth cylinder 71d. An O-ring 74e is inserted into the annular groove 74d, so that the O-ring 74e prevents the brake fluid from leaking to the second bearing 52 through a gap between the third cylinder 71c and the fourth cylinder 71d.

An axial length of the portion of the small-diameter portion inserted into the center through-hole 72d is smaller than an entire axial length of the small-diameter portion of the third cylinder 71c. The space 94 is thereby formed between the end surfaces of the third cylinder 71c and the fourth cylinder 71d facing to each other. The brake fluid discharged from the second outlet port 83 of the pump 39 is supplied to the second discharge passage 93 through the space 94.

O-rings 75a to 75d are arranged at each outer peripheral surface of the first to fourth cylinders 71a to 71d. The O-rings 75a to 75d seal the brake fluid in the suction passages 90b and 92b as well as the discharge passages 91 and 93, each of which is formed in the housing 101. The O-ring 75a is arranged between the suction passage 90b and the discharge passage 91, the O-ring 75b is arranged between the suction passage 90b and the suction passage 92b, the O-ring 75c is arranged between the suction passage 92b and the discharge passage 93, and the O-ring 75d is arranged between the discharge passage 93 and the outside of the housing 101.

A stepped portion is formed in the fourth cylinder 71d at the right-hand side thereof, so that an outer diameter of the stepped portion is made smaller than the outer diameter of the fourth cylinder 71d. The male screw member 102 of the ring shape is attached to the small-diameter stepped portion, so that the pump body 100 is firmly assembled in the housing 101. A tapered portion is formed at the outer peripheral surface of the fourth cylinder 71d on the side to the electric motor 60, so that the outer diameter of the tapered portion is gradually increased in the direction to the electric motor 60. As a result, when the fourth cylinder 71d is pushed in the leftward direction by the male screw member 102, a tapered surface of the tapered portion is pushed to a tapered surface formed at the cylindrical recessed portion 101a of the housing 101. Therefore, even when the driving shaft 54 is rotated, the fourth cylinder 71d is not rotated together.

According to the above-structured pump body 100, the driving shaft 54 is rotated by the rotary shaft 61 (which corresponds to the output shaft of the electric motor 60), so that the pumps 19 and 39 provided in the pump body 100 carry out pumping operation, such as drawing and pumping out the brake fluid.

More exactly, a forward end (a left-hand end) of the rotary shaft 61 is inserted into the second bearing 52 and connected to the driving shaft 54 within the second bearing 52. According to a coupling mechanism between the rotary shaft 61 and the driving shaft 54, a portion of a shaft end is cut away so that a semicircular portion is formed at each end of the shafts. When the forward end of the rotary shaft 61 is inserted into the inner ring 52a of the second bearing 52, the semicircular shaft ends of the rotary shaft 61 and the driving shaft 54 are overlapped with each other in the axial direction, wherein the semicircular shaft ends are displaced in a circumferential direction by 180 degrees from each other. The coupling mechanism is formed as above, so that the rotation of the rotary shaft 61 is transmitted to the driving shaft 54.

Another (backward) end of the rotary shaft 61 of the electric motor 60 is supported by a third bearing 53 fixed to a bottom of a motor casing 62. The third bearing 53 is composed of an inner ring 53a, an outer ring 53b and a rolling element 53c. The backward end of the rotary shaft 61 is inserted into the inner ring 53a, so that the rotary shaft 61 is rotatably supported by the third bearing 53. The outer ring 53b is inserted into a recessed portion 62a formed at the bottom of the motor casing 62, wherein the recessed portion 62a is formed by a bending process. Thus, the third bearing 53 is fixed to the motor casing 62. A spring 63 is provided between the third bearing 53 and a bottom of the recessed portion 62a, so that the outer ring 53b is biased in the axial direction toward the pump body 100.

In addition, since the spring 63 is provided between the third bearing 53 and the bottom of the recessed portion 62a, the inner ring 53a is prevented from being in contact with the bottom of the recessed portion 62a. Other structure of the electric motor 60 is known in the art, so that detailed explanation is omitted here.

Operation of the vehicle brake control system and the pumps 19 and 39 will be hereinafter explained.

When the vehicle movement control, such as a vehicle roll suppressing control, the traction control, the ABS control, and so on, is carried out by the ECU 70, the electric motor 60 is operated to drive the pumps 19 and 39. When the pumps 19 and 39 are driven in the pump body 100, the basic pumping operation is carried out. Namely, the pumps 19 and 39 draw the brake fluid through the suction passages 90a and 92a and pump out the brake fluid through the discharge passages 91 and 93. The brake fluid is sucked from the reservoirs 20 and 40 and discharged into the fluid passages A and E.

In the case that no M/C pressure is generated in the master cylinder 13, for example, in the vehicle roll suppressing control or the traction control, the brake fluid is sucked by the pumps 19 and 39 from the fluid passages D and H and discharged into the fluid passages A and E, so that brake fluid pressure at the wheel cylinders 14, 15, 34 and 35 can be increased. On the other hand, in the case that the excessive brake fluid pressure (which may cause a locked condition at the wheels) is generated at the wheel cylinders 14, 15, 34 and 35, for example, in the ABS control, the brake fluid is released into the reservoirs 20 and 40 through the fluid passages B and F. The brake fluid is sucked by the pumps 19 and 39 from the reservoirs 20 and 40, so that the reservoirs 20 and 40 may not be fully filled with the brake fluid, and that the brake fluid pressure (W/C pressure) is controlled (increased/decreased) so as to keep a wheel slip ratio at a proper value. The vehicle brake control system as well as the pumps 19 and 39 is operated in the above manner.

According to the vehicle brake control system incorporating the pump body 100 having the above pumps 19 and 39, the driving shaft 54 for the pumps 19 and 39 and the rotary shaft 61 of the electric motor 60 are supported by the three bearings 51 to 53. In other words, one of the bearing 52 functions such a bearing for commonly supporting both of the driving shaft 54 and the rotary shaft 61. As a result, when compared with a case in which the driving shaft 54 and the rotary shaft 61 are respectively supported by two bearings, an axial length of the pump body can be made smaller according to the embodiment. In addition, a number of parts and components can be reduced, namely from four to three bearings.

The driving shaft 54 for the pumps 19 and 39 and the rotary shaft 61 of the electric motor 60 are connected to each other via the coupling mechanism, according to which each shaft end is inserted into and coupled together within one bearing (the second bearing 52). Since the pump body 100 is fixed to the housing 101, the second bearing 52 (the inner ring 52a) is thereby fixed to the housing 101. Therefore, when the rotary shaft 61 is simply inserted into the inner ring 52a of the second bearing 52, the rotary shaft 61 is aligned with the driving shaft 54. As above, it is possible to suppress generation of misalignment between two shafts to be connected to each other. Since the rotation of the rotary shaft 61 is transmitted to the driving shaft 54 by means of the above structure, which can suppress the misalignment of the shafts, it is also possible to suppress wear-out at the coupling portion.

In addition, as explained, the second bearing 52 is fixed to the housing 101, as a result that the pump body 100 is fixed to the housing 101. Therefore, when compared with a case, in which the second bearing 52 may be fixed to the electric motor 60 (which is in a condition before being assembled to the housing 101), it is possible according to the present embodiment to stably support the driving shaft 54 of the pump in the housing 101, even before the electric motor 60 is assembled to the housing 101.

Therefore, even when the housing 101 (to which the electric motor 60 is not yet assembled) is vibrated during transportation, the driving shaft 54 is firmly and stably held by the second bearing 52. Therefore, there is no danger that the driving shaft 54 and/or the seal members 121 and 122 in contact with the rotating portions connected to the driving shaft 54 may be damaged.

The seal members 121 and 122 are provided in the first casing and the second bearing 52 is provided in the second casing, which is arranged on the side to the electric motor 60. In other words, the second bearing 52 is arranged at the position, which is an outer side of the pumpbody 100 than the seal members 121 and 122. Therefore, it is possible to avoid such a situation that the rotary shaft 61 may damage the seal member 121 and 122 when the rotary shaft 61 is assembled to the driving shaft 54.

Other Embodiments

In the above embodiment, the rotary type pump of the present invention is applied to the vehicle braking system. The invention should not be limited to such embodiment. The structure of the present invention, in which the driving shaft of the pump and the rotary shaft of the electric motor are supported by the three bearings, and in which the driving shaft and the rotary shaft are commonly supported by one bearing, may be applied to any other devices.

According to the above embodiment, the first to third cylinders 71a to 71c and the center plates 73a and 73b are integrated together by welding. When the outlet ports 81 and 83 are so arranged that each of them is provided at each axial end of the first casing, the high pressure is applied to each axial end. Therefore, it is not always necessary to integrate the above parts by welding. And it may be possible to suppress possible leakage of the brake fluid through gaps between the first to third cylinders 71a to 71c and the first and second center plates 73a and 73b.

In the above embodiment, the ball bearing is used. However, any other types of bearings, such as slipping bearings, radial bearings and so on, may be used in the present invention.

What is claimed is:

1. A structure for coupling two rotary shafts comprising:
   a first shaft and a second shaft, which are coaxially coupled with each other;
   a first bearing directly or indirectly fixed to a housing;
   a second bearing directly or indirectly fixed to the housing; and
   a third bearing directly or indirectly fixed to the housing,
   wherein the first shaft is rotatably supported only by the first and second bearings,
   the second shaft is rotatably supported by the second and third bearings,
   one end of each of the first and second shafts is inserted into and is in direct contact with the second bearing so that the first and second shafts are rotatably supported by the second bearing, and the one end of the first shaft and the one end of the second shaft are operatively coupled to each other to transmit rotation of one of the first and second shafts to the other one of the first and second shafts; and
   other ends of the first and second shafts, which are located on ends of the first and second shafts opposite the second bearing, are supported by the first and third bearings respectively.

2. A pump device of a rotary type comprising:
   a pump body having a pump casing;
   a pump accommodated in the pump casing, the pump having an inlet port for drawing working fluid and supplying the working fluid into a working chamber, the pump having an outlet port for discharging the working fluid from the working chamber;

a driving shaft accommodated in the pump casing and for driving the pump;

a housing having a cylindrical recessed portion, into which the pump body is inserted;

an electric motor having an output shaft operatively coupled to the driving shaft so that the driving shaft is rotated by the rotation of the output shaft, wherein a structure for coupling two rotary shafts is characterized in that;

the structure for coupling two rotary shafts according to the claim 1 is applied to the coupling between the driving shaft and the output shaft, the driving shaft corresponds to the first shaft, and the output shaft corresponds to the second shaft, and the second bearing is fixed to the pump casing, so that the second bearing is finally fixed to the housing.

3. The pump device of the rotary type according to the claim 2, wherein a seal member is provided between the pump casing and the driving shaft for sealing the pump from the electric motor, and the second bearing is provided between the seal member and the electric motor.

4. The pump device of the rotary type according to the claim 3, wherein the pump casing has a cylindrically shaped first casing for accommodating the pump and a second casing coaxially fixed to the first casing, the second casing being arranged between the first casing and the electric motor, the seal member is provided in the first casing, and the second bearing is provided in the second casing.

5. A pump device of a rotary type comprising:

a pump body having a pump casing;

a pump accommodated in the pump casing, the pump having an inlet port for drawing working fluid and supplying the working fluid into a working chamber, the pump having an outlet port for discharging the working fluid from the working chamber;

a driving shaft accommodated in the pump casing and for driving the pump;

a housing having a cylindrical recessed portion, into which the pump body is inserted;

an electric motor having an output shaft operatively and coaxially coupled to the driving shaft so that the driving shaft is rotated by the rotation of the output shaft;

a first bearing directly or indirectly fixed to the housing;

a second bearing fixed to the pump casing, so that the second bearing is fixed to the housing; and a third bearing directly or indirectly fixed to the housing; wherein the driving shaft is rotatably supported only by the first and second bearings, the output shaft is rotatably supported by the second and third bearings, one end of each of the driving shaft and the output shaft are inserted into the second bearing so that the driving shaft and the output shaft are rotatably supported by the second bearing and the one ends of the driving shaft and the output shaft are operatively coupled to each other to transmit rotation of one of the driving shaft and the output shaft to an other of the driving shaft and the output shaft, the output shaft including an other end opposite the one end supported by the third bearing, a seal member is provided between the pump casing and the driving shaft for sealing the pump from the electric motor, and the second bearing is provided between the seal member and the electric motor.

6. A pump device of a rotary type comprising:

a pump body having a pump casing;

a pump accommodated in the pump casing, the pump having an inlet port for drawing working fluid and supplying the working fluid into a working chamber, the pump having an outlet port for discharging the working fluid from the working chamber;

a driving shaft accommodated in the pump casing and for driving the pump;

a housing having a cylindrical recessed portion, into which the pump body is inserted;

an electric motor having an output shaft operatively and coaxially coupled to the driving shaft so that the driving shaft is rotated by the rotation of the output shaft;

a first bearing directly or indirectly fixed to the housing;

a second bearing fixed to the pump casing, so that the second bearing is fixed to the housing; and a third bearing directly or indirectly fixed to the housing; wherein the driving shaft is rotatably supported only by the first and second bearings, the output shaft is rotatably supported by the second and third bearings, one end of each of the driving shaft and the output shaft are inserted into the second bearing so that the driving shaft and the output shaft are rotatably supported by the second bearing and the one end of each of the driving shaft and the output shaft are operatively coupled to each other to transmit rotation of one of the driving shaft and the output shaft to an other of the driving shaft and the output shaft, the output shaft including an other end opposite the one end supported by the third bearing, a seal member is provided between the pump casing and the driving shaft for sealing the pump from the electric motor, the second bearing is provided between the seal member and the electric motor, the pump casing has a cylindrically shaped first casing accommodating the pump and a second casing coaxially fixed to the first casing, the second casing being arranged between the first casing and the electric motor, the seal member is provided in the first casing, and the second bearing is provided in the second casing.

* * * * *